(12) United States Patent
Yun et al.

(10) Patent No.: US 7,903,619 B2
(45) Date of Patent: Mar. 8, 2011

(54) CONTROL SYSTEM AND MULTIPLE ACCESS METHOD IN WIRELESS COMMUNICATION SYSTEM

(75) Inventors: Sang-Boh Yun, Seongnam-si (KR); Yung-Boo Kim, Seongnam-si (KR); Ki-Ho Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 813 days.

(21) Appl. No.: 11/872,502

(22) Filed: Oct. 15, 2007

(65) Prior Publication Data

US 2008/0037672 A1 Feb. 14, 2008

Related U.S. Application Data

(62) Division of application No. 10/909,080, filed on Jul. 30, 2004, now Pat. No. 7,313,126.

(30) Foreign Application Priority Data

Jul. 31, 2003 (KR) .................................. 2003/53141

(51) Int. Cl.
*H04J 3/00* (2006.01)
(52) U.S. Cl. .......... 370/337; 370/344; 370/208; 455/450
(58) Field of Classification Search .................. 370/337, 370/344, 208; 455/450
See application file for complete search history.

(56) References Cited

U.S. PATENT DOCUMENTS

| | | | |
|---|---|---|---|
| 5,754,533 A * | 5/1998 | Bender et al. .................. | 370/252 |
| 6,009,428 A * | 12/1999 | Kleewein et al. ...................... | 1/1 |
| 6,351,458 B2 | 2/2002 | Miya et al. | |
| 6,657,982 B1 | 12/2003 | Fong et al. | |
| 6,741,550 B1 * | 5/2004 | Shin .............................. | 370/209 |
| 6,757,550 B1 | 6/2004 | Yoneyama et al. | |
| 7,046,655 B2 | 5/2006 | Marinier et al. | |
| 7,180,873 B1 * | 2/2007 | Monte et al. .................. | 370/325 |
| 7,206,604 B2 | 4/2007 | Berra et al. | |
| 7,502,596 B2 | 3/2009 | Takao et al. | |
| 7,706,308 B2 | 4/2010 | Yun et al. | |
| 2001/0038620 A1 | 11/2001 | Stanwood et al. | |
| 2003/0043770 A1 | 3/2003 | Moon et al. | |
| 2003/0195007 A1 * | 10/2003 | Hayashi et al. ................ | 455/450 |
| 2003/0223400 A1 * | 12/2003 | Knisely et al. ................ | 370/346 |
| 2004/0066754 A1 | 4/2004 | Hottinen | |

FOREIGN PATENT DOCUMENTS

CN 1126540 7/1996

(Continued)

*Primary Examiner* — Danh C Le
(74) *Attorney, Agent, or Firm* — The Farrell Law Firm, P.C.

(57) ABSTRACT

A multiple access method in a wireless communication system using a plurality of multiple access techniques is provided. When a call is established with a wireless terminal, the terminal transmits a duplexing mode determination factor to the base station to set a time or frequency division duplexing mode for reverse transmission and determine access and hopping modes according to each of the division duplexing modes, and establishes forward and reverse channels according to the set time or frequency division duplexing mode for reverse transmission to communicate with the base station. The base station receives the duplexing mode determination factor from the terminal, sets a time or frequency division duplexing mode for reverse transmission and sets a time division duplexing mode for forward transmission based on the received factor, and determines frequency hopping and multiple access modes to communicate with the terminal according to the determined frequency and multiple access modes.

9 Claims, 10 Drawing Sheets

FOREIGN PATENT DOCUMENTS

| | | |
|---|---|---|
| CN | 1314064 | 9/2001 |
| CN | 1332536 | 1/2002 |
| JP | 2002-345014 | 11/2002 |
| KR | 102001007474 | 8/2001 |
| KR | 102004006956 | 8/2004 |
| WO | WO 00/07399 | 2/2000 |

* cited by examiner

CONTROL SYSTEM AND MULTIPLE ACCESS METHOD IN WIRELESS COMMUNICATION SYSTEM

PRIORITY

This application is a divisional of and claims priority under 35 U.S.C. §121 to U.S. application Ser. No. 10/909,080 filed in the U.S. Patent and Trademark Office on Jul. 30, 2004, now U.S. Pat. No. 7,313,126 the contents of which are incorporated herein by reference. This application claims priority under 35 U.S.C. §119(a) to an application filed in the Korean Intellectual Property Office on Jul. 31, 2003 and assigned Serial No. 2003-53141, the contents of which are incorporated herein by reference.

BACKGROUND OF THE INVENTION

1. Field of the Invention

The present invention relates generally to an access method and a system therefor in a wireless communication system, and more particularly to a multiple access method and a system therefor in a wireless communication system using at least two multiple access techniques.

2. Description of the Related Art

In its initial stage, a wireless communication system was developed to support the mobility of users and provide a voice communication service. As technology advances, a wireless communication system capable of providing a data communication service as well as the voice communication service has been commercialized. The current mobile communication technology called "third generation" is mainly divided into a 3GPP2 standard for synchronous systems and a 3GPP standard for asynchronous systems. The third generation technology is based on the voice communication service in terms of the traffic type but it is under study and development, focusing more on a multimedia service.

The 4G mobile communication system, which will be provided in the near future, needs to have improved system performance over the 3G mobile communication system. One of the most important requirements for the 4G mobile communication system is the ability to provide a multimedia service at a high rate. Efficient use of frequencies is necessary to meet this requirement. Additionally, high Quality of Service (QoS) must also be guaranteed in various channel environments.

The 3G mobile communication system uses Adaptive Modulation & Coding (AMC) or water filling per subcarrier in order to transmit data at a high rate in a limited frequency band. Although the AMC or water filling technique can increase the frequency efficiency, these techniques can only be used under certain conditions.

For example, the technique requires real-time channel state information. Also, channel feedback is required in a Frequency Division Duplexing (FDD) mode. A large amount of information is required for complete feedback transmission of rapidly varying channels. If the complete feedback transmission is not performed, channel states varying in real time cannot be reflected in the system. Additionally, if a mobile terminal moves at a high speed, the channel variation thereof increases. This makes appropriate use of the AMC technique difficult.

Accordingly, the AMC and water filling techniques can be effectively used to increase frequency efficiency for channels that require no channel feedback, differently from the frequency division duplexing mode. That is, the techniques can be used in environments in which channel feedback information can be obtained with a minimum load.

Also, as the terminal moves more slowly, algorithms for the AMC and water filling techniques can be applied more effectively. In these conditions, the AMC and water filling techniques can provide high rate data transmission with higher frequency efficiency.

However, the increase of frequency efficiency is needed to transmit a large amount of data in the mobile communication environment. A frequency reuse factor needs to approach one to increase the frequency efficiency. Interference between neighboring cells must be suppressed to bring the frequency reuse factor near one. Some examples of the method for suppressing the interference are interference avoidance and interference averaging.

The AMC and water filling based techniques, which can increase the frequency efficiency, bring about no synergy with the interference avoidance technique that can bring the frequency reuse factor near one.

As indicated above, the next generation wireless communication system requires higher rate data transmission. Effective use of frequencies is necessary to transmit data at a higher rate. However, the conventional techniques, including ones currently in development, provide no solution for highly effective use of frequencies.

SUMMARY OF THE INVENTION

Therefore, the present invention has been designed in view of the above and other problems, and it is an object of the present invention to provide a method and system for effectively utilizing frequencies in a wireless communication system.

It is another object of the present invention to provide a method and system for transmitting data while satisfying a required QoS.

It is yet another object of the present invention to provide a method and a control system for effectively utilizing frequencies and providing a high-speed multimedia service.

In accordance with one aspect of the present invention, the above and other objects can be accomplished by a call control method in a base station of a wireless communication system that communicates with a wireless terminal in time and frequency division duplexing modes, the method comprising the steps of: a) checking a duplexing mode determination factor received from the wireless terminal when a call is allocated to the wireless terminal, and determining whether the wireless terminal is located in a local or remote area of the base station, based on the duplexing mode determination factor; and b), if the wireless terminal is in the local area, allocating a time division duplexing channel to forward and reverse links of the wireless terminal, and, if the wireless terminal is in the remote area, allocating a time division duplexing channel to a forward link of the wireless terminal and determining a frequency hopping mode and a multiple access mode for the allocated channel, and then allocating a frequency division duplexing channel to a reverse link of the wireless to perform communication with the wireless terminal.

In accordance with another aspect of the present invention, there is provided wireless communication system including a base station for communicating with wireless terminals, the base station providing a service to the wireless terminals in time and frequency division duplexing modes depending on duplexing mode determination factors of the wireless terminals, the system comprising: a wireless terminal for transmitting a duplexing mode determination factor to the base station when a call is established, setting a time or frequency division duplexing mode for reverse transmission as set by the base station, and determining an access method and a hopping mode according to each of the time and frequency division duplexing modes and then establishing a forward channel and a reverse channel according to the set time or frequency division duplexing mode for reverse transmission to perform communication with the base station; and the base station for receiving a duplexing mode determination factor from the wireless terminal when a call is established, setting a time division duplexing mode or a frequency division duplexing mode for reverse transmission and setting a time division duplexing mode for forward transmission on the basis of the received duplexing mode determination factor, and determining a frequency hopping mode and a multiple access mode, and then performing communication with the wireless terminal according to the determined frequency hopping and multiple access modes.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
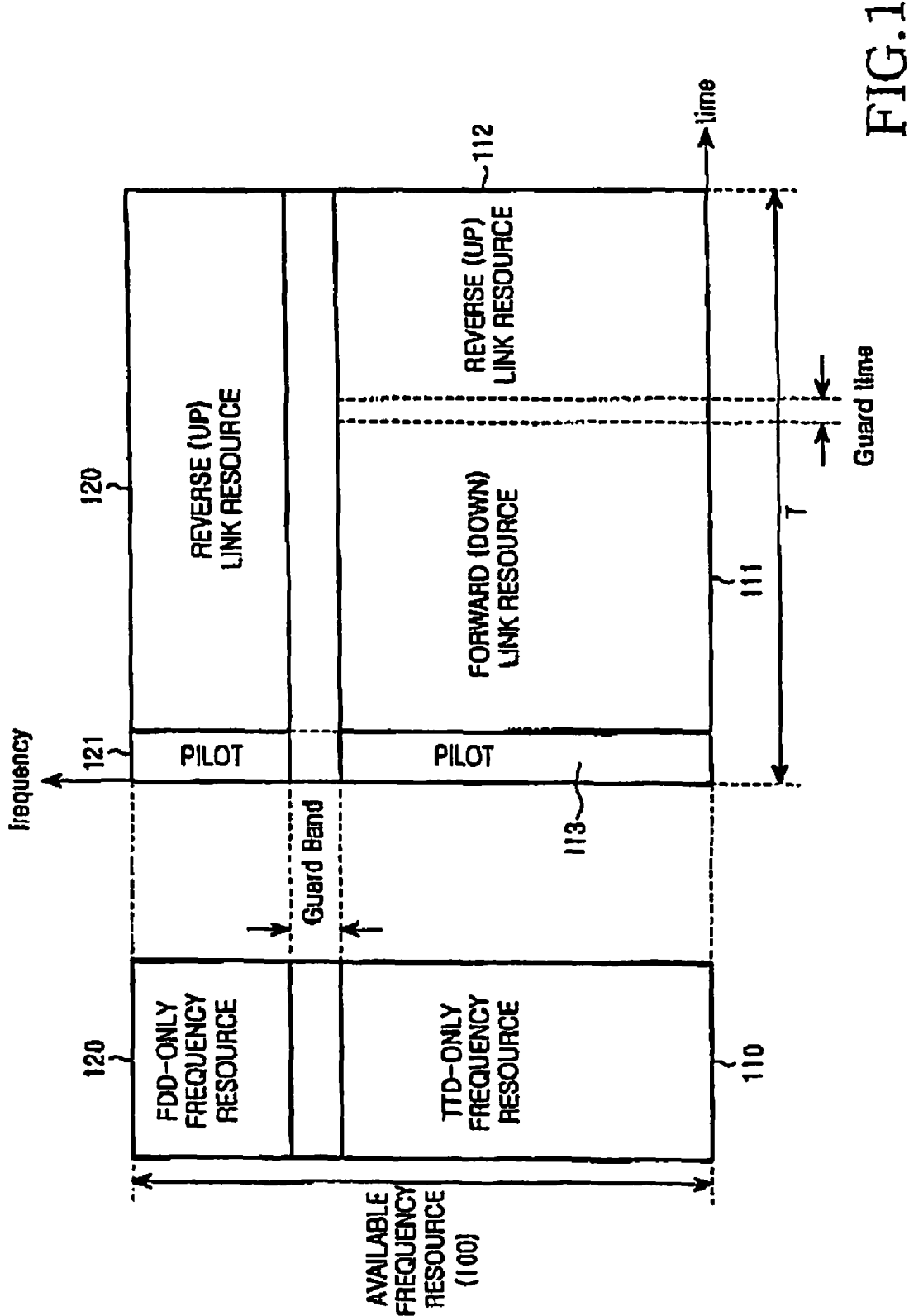
FIG. 1 is a diagram illustrating a method of using frequency resources available in a wireless communication system according to the present invention.

Preferred embodiments of the present invention will be described in detail herein below with reference to the annexed drawings. In the drawings, the same or similar elements are denoted by the same reference numerals even though they are depicted in different drawings.

In the following description, a variety of specific elements such as detailed messages or signals are shown. The description of such elements has been made only for a better understanding of the present invention. Accordingly, those skilled in the art will appreciate that the present invention can be implemented without using the above-mentioned specific elements.

Further, in the following description of the present invention, a detailed description of known functions and configurations incorporated herein will be omitted when it may obscure the subject matter of the present invention.

The present invention provides a wireless communication system that uses both time and frequency division duplexing methods having different advantages. However, the present invention does not disclose a method using a mere aggregation of the time and frequency division duplexing methods.

More specifically, in the present invention, the cell area of a base station is divided into large and small cells or into macro and micro cells or into local and remote areas about the base station. Here, it should be noted one cell corresponds to one base station. Because these cell area division methods are similar, the large cell is referred to as a "remote area", which indicates an area relatively distant from the base station, in the following description. The small cell is referred to as a "local area", which indicates an area relatively near to the base station.

Additionally, in the present invention, communication may be performed in different communication schemes in the local and remote areas divided in such a manner. However, as circumstances demand, terminals in the same location may also use different communication schemes, and terminals in the remote area may also use a communication scheme typically used in the local area. The present invention also discloses a method for performing uninterrupted communication with a wireless terminal when the wireless terminal moves from the local area to the remote area and also when it moves from the remote area to the local area, and provides a coordination method between systems when the time and frequency division duplexing methods are used at the same time.

In the present invention, a description will also be given of a method of using an Orthogonal Frequency Division Multiple Access (OFDMA) method based on the AMC and water filling techniques, and a method of using a Frequency Hopping (FH)-OFDMA method based on the frequency hopping technique.

FIG. 1 is a diagram illustrating a method of using frequency resources available in a wireless communication system according to the present invention. In FIG. 1, reference numeral 100 indicates frequency resources available to a base station. In the present invention, the available frequency resources are mainly divided into two frequency resource portions, i.e., a TDD (Time Division Duplexing)-only frequency resource portion 110 and an FDD (Frequency Division Duplexing)-only frequency resource portion 120. More frequency resources can be allocated to the TDD-only frequency resource portion 110 than to the FDD-only frequency resource portion 120. Frequency resources of the FDD-only frequency resource portion 120 are allocated to wireless terminals in a specific state, which will be described in more detail later, and they are allocated only to the reverse link in the present invention.

Due to data and service characteristics of the multimedia data, the amount of data transmitted in the reverse direction is highly likely to be much smaller than the amount of data transmitted in the forward direction. As a result, the small amount of frequency resources of the FDD-only frequency resource portion 120 are capable of performing the reverse transmission. Accordingly, a narrower band of frequencies are allocated to the FDD-only frequency resource portion 120 than to the TDD-only frequency resource portion 110

As described above, frequencies of the FDD-only frequency resource portion 120 are used only in the reverse link. As a result, the base station allocates the FDD-only frequency resource portion 120 to specific wireless terminals from among wireless terminals intending to transmit data in the reverse link, thereby enabling the specific wireless terminals to transmit data in the reverse direction.

In the TDD-only frequency resource portion 110, every frequency is divided in time to be used for transmission, and the same frequencies are used in the forward and reverse links. However, the same frequencies are used in different time intervals. As illustrated on the right side of FIG. 1, the TDD-only frequency resource portion 110 is divided into a time interval 111 for forward (or down)-link traffic transmission and a time interval 112 for reverse (or up)-link traffic transmission. In the description of the present invention, the term "forward" refers to the direction from the base station to the terminal, and the term "reverse" refers to the direction from the terminal to the base station.

A transmission period T comprises the two repeating time intervals 111 and 112 respectively for forward and reverse link traffic transmission and another repeating time interval 113 for pilot transmission. A guard time having a predetermined time interval is also needed between the two time intervals 111 and 112 for forward and reverse link traffic transmission. The transmission time separation using the guard time avoids overlap between the forward and reverse transmission due to a time delay of the forward and reverse transmission. To coincide with the period of the TDD-only frequency resource portion 110, the transmission period of the FDD-only frequency resource portion 120 used only for the reverse link transmission also has a time interval 121 for pilot transmission. The pilot transmission of the FDD-only frequency resource portion 120 may be performed at intervals of the same period as the period T of the TDD-only frequency resource portion 110.

Figure 2:
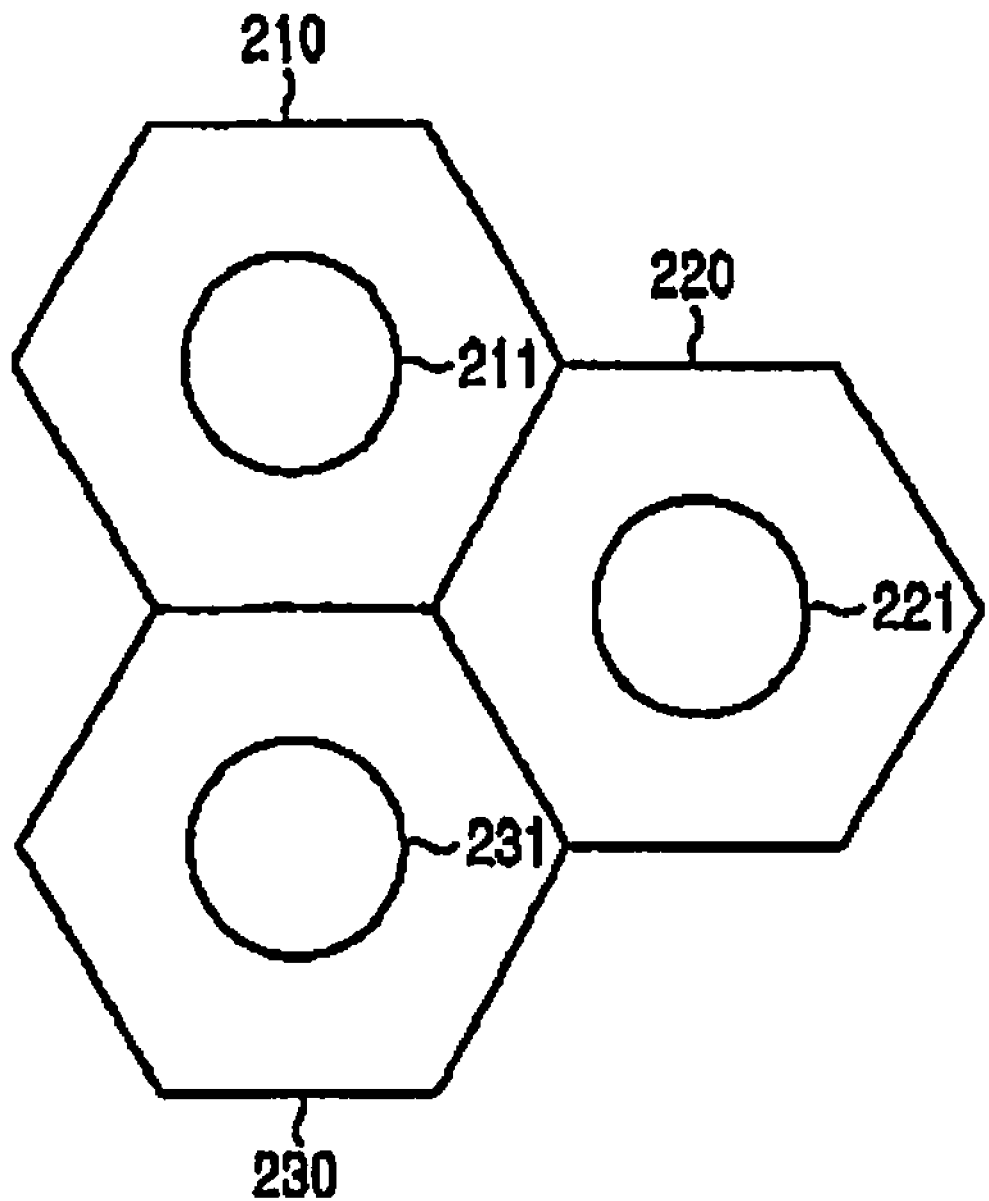
FIG. 2 is a diagram illustrating service areas of base stations to which the FDD and TDD-only frequency resource portions are allocated according to the present invention.

FIG. 2 is a diagram showing service areas of base stations to which the FDD and TDD-only frequency resource portions are allocated according to the present invention. In FIG. 2, hexagonal cells 210, 220, and 230 are ideal models of the service areas of base stations when the base stations are composed of cellular communication systems. A base station is positioned in the center of each of the hexagonal cells 210 to 230. As described above, the hexagonal cells are only ideal models. Commonly, cells have different shapes when the base stations are composed of cellular communication systems. However, for convenience of illustration, the following description will be given under the assumption that the cells have a uniform hexagonal shape.

Referring to FIG. 2, circles 211, 221, and 231 in the hexagonal cells 210, 220, and 230 indicate positions within a predetermined distance from the base stations located in the center of the hexagonal cells 210, 220, and 230. In this ideal example, the service areas of the base stations may be divided into local areas inside the circles 211, 221, and 231 and remote areas outside the circles 211, 221, and 231. Here, it should be noted that the local and remote areas in FIG. 2 belong not to different cells but to a single cell in which communication is performed with a transceiver in the same base station. The division of the cell into the local and remote areas is only for explanation of the present invention. TDD and FDD areas in the present invention are not separated physically from each other. That is, terminals in a single cell may operate in the TDD mode or in the FDD mode depending on various conditions or circumstances.

As described above, each of the base stations has service areas divided into a local area and a remote area. If the base stations are sector type base stations, each of which is divided into sectors, each of the sectors has local and remote areas. Such a base station generally has three sectors. If the base station has at least two sectors, the sectors may have different local and remote areas. Practically, the division of local and remote areas of a base station may be based on the intensity or the like of a pilot signal reported by a wireless terminal or on transmission power level during communication.

Duplexing mode determination factors according to the present invention, which will be described later in more detail, may include the distance of the base station from a wireless terminal, the traveling speed of the wireless terminal, received signal power levels of the base station and the wireless terminal, or the like. For example, if the intensity of a pilot signal reported by a wireless terminal, as one duplexing mode determination factor, is lower than a predetermined threshold, it is determined that the wireless terminal is located in a remote area; otherwise it is determined that it is located in a local area.

However, if transmission power above a predetermined threshold is required to transmit traffic when the base station communicates with a wireless terminal, it is determined that the wireless terminal is located in a remote area; otherwise it is determined that the wireless terminal is located in a local area.

Alternatively, if the base station includes a map containing information of the shape of its service area or the like, and receives a location information signal from a wireless terminal, the base station can determine whether the wireless terminal is located in a local or remote area, by comparing the map information with the location information reported by the wireless terminal.

Accordingly, the above-described determination methods may be used individually or they may also be used jointly.

In the description of the present invention, the term "duplexing mode determination factors" refers to information containing all factors used to determine the duplexing mode, which is transmitted from the wireless terminal to the base station. The wireless terminal produces a duplexing mode determination factor in the form of a message and reports the message to the base station.

Terminal users can receive the FDD service in the entire service area of a base station. That is, the FDD resources in the reverse link can be allocated not only to users located in the outer service area, but also to users located in the inner service area when the latter users are in a bad channel environment or in motion at high speed. In FIG. 2, the service area in which the terminals can operate in the TDD mode can be extended to the outer cell area. That is, even when the terminals are located at the cell edge, they can operate in the TDD mode. This indicates that the inner cell area is identical to the external cell area. The cell division of FIG. 2 is only a logical division for efficient mode allocation. Practically, the cell is not divided physically and it is a single cell, regardless of whether the terminal operates in the TDD or FDD mode. In the entire cell area, communication can be performed in a TDD-only mode and can also be performed in an FDD-only mode.

In addition, even when FDD reverse transmission resources are allocated to terminals, the terminals can perform TDD mode transmission in the reverse link depending on control of the base station. Here, TDD reverse-link channels are mainly used to transmit pilots for channel estimation of the TDD mode. The base station can instruct terminals in the entire service area, which are stationary or in motion at low speed, to transmit pilots for channel estimation through the TDD reverse channels. In this manner, the base station uses the pilots to perform channel estimation and to allocate TDD forward-link resources. This is to utilize channel reciprocity, which is an advantage of the TDD.

Duplexing mode resources is generally allocated in such a manner that terminals in the local area are allocated TDD mode resources, whereas terminals in the remote area are allocated TDD resources in the forward link and FDD resources in the reverse link. This duplexing mode allocation method is not necessary. For example, even when the terminals are located in the local area, they can be allocated FDD reverse channel resources depending on determination of a duplexing mode allocation algorithm. In addition, even when the terminals are located in the local area, they can be allocated TDD reverse channel resources depending on determination of the duplexing mode allocation algorithm.

A detailed description will now be given of how reverse and forward links are established according to the present invention, when the frequency resources are divided into the TDD and FDD-only frequency resource portions 110 and 120 as illustrated in FIG. 1 and the cell of a base station is divided into local and remote areas as described above in conjunction with FIG. 2.

If the base station communicates with wireless terminals located in the local area, the TDD scheme is used for communication in both the forward and reverse links. However, if the base station communicates with wireless terminals located in the remote area, the TDD scheme is used for communication in the forward link and the FDD scheme is used for communication in the reverse link. As a result, traffic transmission in the forward link established between a base station and wireless terminals is always performed using the TDD-only frequency resource portion 110, regardless of whether the terminals are located in the local or remote area.

When wireless terminals located in the local area perform traffic transmission in the reverse link, they generally use the TDD-only frequency resource portion 110. When wireless terminals located in the remote area perform traffic transmission in the reverse link, they use the FDD-only frequency resource portion 120. However, even when the terminals are located remotely, they can use TDD reverse link resource depending on determination of the duplexing mode allocation algorithm, and can also use the FDD reverse link resource and the TDD reverse link resource at the same time. The TDD reverse link resource is allocated to the terminals in the remote area in order to instruct the terminals to transmit pilots through the TDD reverse channels to extract the CQI or CSI information from the terminals that are stationary or in motion at low speed. Not only pilots but also general data can be transmitted through the TDD reverse resources. The terminals in the remote area can operate in both the TDD and FDD modes because they are in the same cell.

In this manner, more frequency resources are allocated to the forward link than to the reverse link, thereby achieving an asymmetric service. The TDD-only frequency resource portion 110 of a predetermined period is divided into variable time intervals to be used for transmission in the forward and reverse links. This enables an asymmetric service with variable durations of the forward and reverse links, instead of an asymmetric service with fixed widths of the forward and reverse links.

Simulations or experiments may be used to find an optimal division value (for example, an optimal division ratio) of the available frequency resource 100 into the TDD and FDD-only frequency resource portions 110 and 120. Different allocations of the TDD and FDD-only frequency resource portions 110 and 120 can be made to different base stations, and the same allocation thereof can also be made to every base station.

A description will now be given of how frequencies are allocated to the local and remote areas illustrated in FIG. 2, with reference to the frequency allocation method of FIG. 1.

Resources corresponding to the time interval 111 in the TDD-only frequency resource portion 110 are allocated to terminals located in the local and remote areas for forward link transmission. Resources corresponding to the time interval 112 in the TDD-only frequency resource portion 110 are mainly allocated to terminals located in the local area for reverse link transmission. A specific terminal can be allocated TDD frequencies according to determination of the base station even when the terminal is in the remote area.

While the resources of the TDD-only frequency resource portion 110 are divided according to the local and remote areas in this manner, resources of the FDD-only frequency resource portion 120 are all allocated to the terminals in the local and remote areas only for the reverse link. Using the FDD-only frequency resource portion 120, all terminals located in the local and remote areas of a base station can notify the base station of their channel states. The following is an example of this channel state notification using the FDD-only frequency resource portion 120.

All terminals located in the local and remote areas of a base station check the intensity, QoS, etc., of a pilot signal received from the base station in the forward direction. Through this pilot signal check, each of the terminals located in the local and remote areas can check the channel state of a frequency resource through which the pilot signal is received. Based on the received pilot channel state, each of the terminals generates channel state information to be fed back to the base station. This channel state information may be generated in the form of a message including a Channel Quality Indicator (CQI) or a Channel State Indicator (CSI). Each terminal can inform the base station of its received channel state by feeding the CQI or CSI message back to the base station in the reverse direction through the FDD-only frequency resource portion 120. Each of the terminals, which can be divided into terminals in the local area and in the remote area or divided into stationary, slow-moving and fast-moving terminals, can conduct channel reciprocity with the base station by feeding the CQI or CSI information back to the base station.

Next, a description will be given of how a multiple access method is performed in each of the local and remote areas into which the cell area is divided as illustrated in FIG. 2, or in each of the areas into which the cell area is divided according to the duplexing mode determination factors such as the traveling speed of the wireless terminal.

The duplexing mode determination factor described above includes the distance between the base station and the wireless terminal and the traveling speed of the wireless terminal. In order for a terminal to be determined to be located in the local area, the terminal must be located in a local area where data can be transmitted at a high transfer rate or be in motion at low speed. The local area can be implemented in the form of a spat cell. If terminals are determined to be located in the local area, allocation of the TDD-only frequency resource portion to the terminals simplifies their channel estimation. As described above, the determination as to whether the terminals are in the local area may also be based on the traveling speed of the terminals. In the local area, the channel fading is low. Accordingly, it is preferable or easy for the base station to use an AMC technology and an MIMO (Multiple Input Multiple Output) technology, which employs multiple antennas, for the terminals determined to be located in the local area.

Terminals are determined to be located in the remote area when they are located distant from the base station or are in motion at high speed. Terminals located in the remote area require channels robust against interference. It is thus preferable to allocate the FDD-only frequency resource to the terminals in the remote area, and it is also preferable not to use the MIMO and AMC technologies for the terminals in the remote area. However, the TDD mode, MIMO and AMC methods can be applied to a specific terminal according to determination of the base station.

Figure 3:
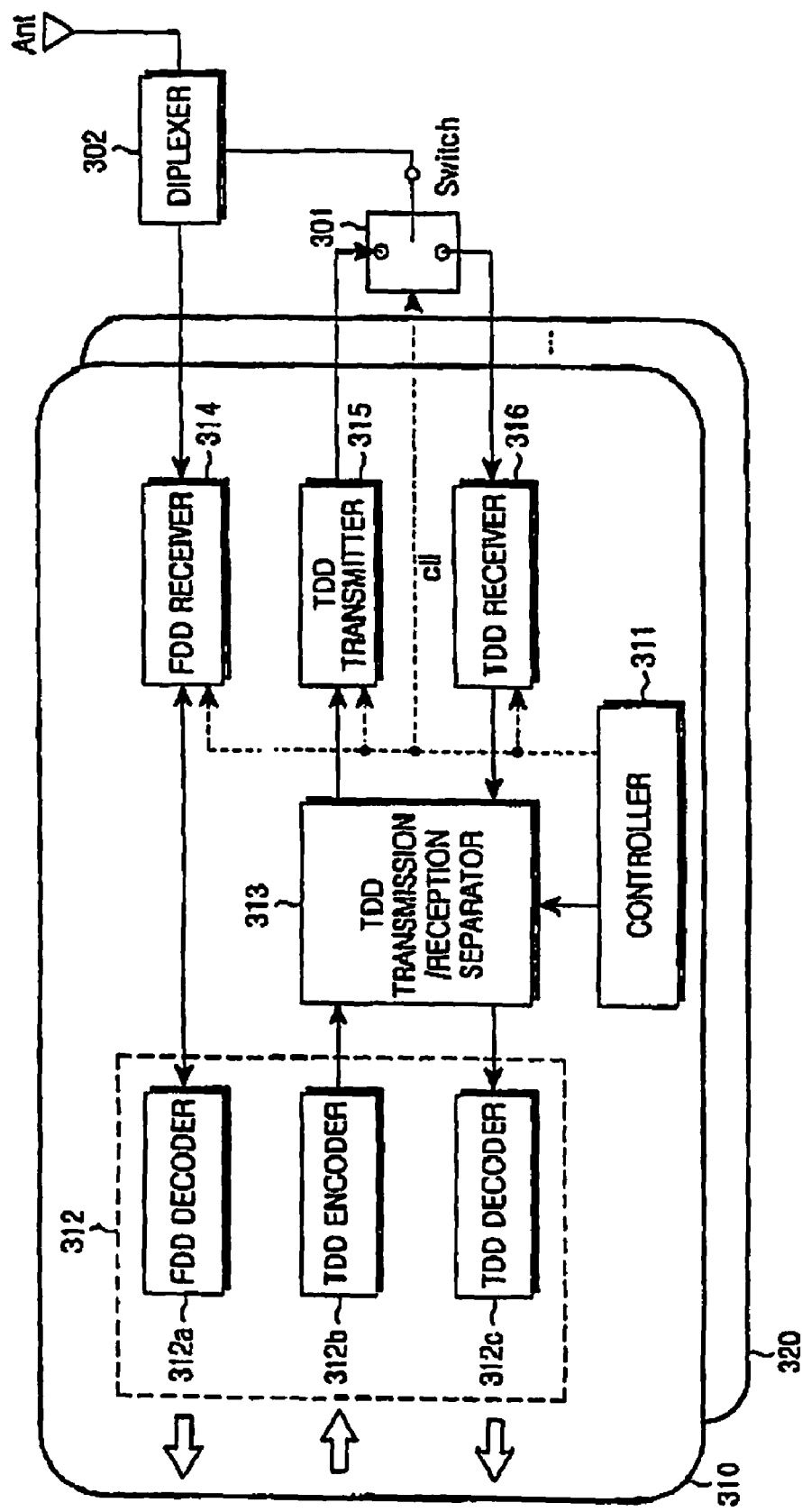
FIG. 3 is a block diagram illustrating a configuration of elements for transmitting and receiving traffic in a base station device in a wireless communication system that utilizes both the time and frequency division duplexing.

FIG. 3 is a block diagram illustrating a configuration of elements for transmitting and receiving traffic in a base station device in a wireless communication system that employs both the time and frequency division duplexing. Referring to FIG. 3, the base station device includes a number of elements 310 to 320, each of which includes a controller 311, a TDD transmission/reception separator 313, an encoder processor 312, and a modem/wireless module. The encoder processor 312 includes an FDD decoder 312a, a TDD encoder 312b, and a TDD decoder 312c. The modem/wireless module includes an FDD receiver 314, a TDD transmitter 315, and a TDD receiver 316.

The FDD decoder 312a decodes coded symbols received over the reverse link and converts them to corresponding data. The FDD decoder 312a is connected to the FDD receiver 314. The FDD receiver 314 down converts a reverse wireless signal received from a diplexer 302, and outputs the converted signal to the FDD decoder 312a.

The TDD encoder 312b and the TDD decoder 312c are connected with the TDD transmission/reception separator 313. The TDD transmitter 315 and the TDD receiver 316 are also connected with the TDD transmission/reception separator 313. The TDD encoder 312b encodes traffic to be transmitted, and outputs the encoded traffic to the TDD transmission/reception separator 313. The TDD transmission/reception separator 313 outputs the encoded traffic to the TDD transmitter 315, which then up converts and outputs the encoded traffic to a switch 301.

The TDD receiver 316 down converts a signal received from the switch 301 and outputs it to the TDD transmission/reception separator 313. The TDD transmission/reception separator 313 outputs a signal received from the TDD receiver 316 to the TDD decoder 312c. The TDD transmission/reception separator 313 separates and processes transmission and reception traffic under the control of the controller 311.

The controller 311 controls the path of transmission and reception traffic of the TDD transmission/reception separator 313 depending on the forward and reverse link transmission as described above in FIG. 1. The controller 311 controls each block of the encoder processor 312 and controls modulation/demodulation and wireless processing of the modem/wireless module. Further, the controller 311 controls the switch 301 to switch to the TDD transmitter 315 or to the TDD transmitter 316 when it is time to perform the forward or reverse link transmission as illustrated in FIG. 1. In this manner, the switch 301 connects the diplexer 302 to the TDD transmitter 315 or to the TDD receiver 316 under the control of the controller 311. The controller 311 further performs fast Frequency Hopping (FH), spreading, AMC, water filling, MIMO (Multiple Input Multiple Output) mode control, or comb-type AMC control. This will be described later in detail with reference to the flow chart in FIG. 4 and in the explanation of FIGS. 6 and 7.

Referring back to FIG. 3, the diplexer 302 is connected to an antenna Ant and also to the FDD receiver 314 and the switch 301. The diplexer 302 separates a signal in a frequency band, which corresponds to the FDD-only frequency resource portion 120 as illustrated in FIG. 1, from the signal received from the antenna Ant, and outputs the separated signal to the FDD receiver 314. Also, the diplexer 302 separates a signal in a frequency band, which corresponds to the TDD-only frequency resource portion 110 as illustrated in FIG. 1, from the signal received from the antenna Ant, and outputs the separated signal to the switch 310.

The diplexer 302 also transmits a signal received from the switch 301 to wireless terminals through the antenna Ant. Traffic of the signal, which the diplexer 302 receives from the switch 301 and outputs to the antenna Ant, corresponds to the traffic transmitted in the time interval 111 for the forward link in the TDD-only frequency resource portion 110 as illustrated in FIG. 1.

Figure 4:
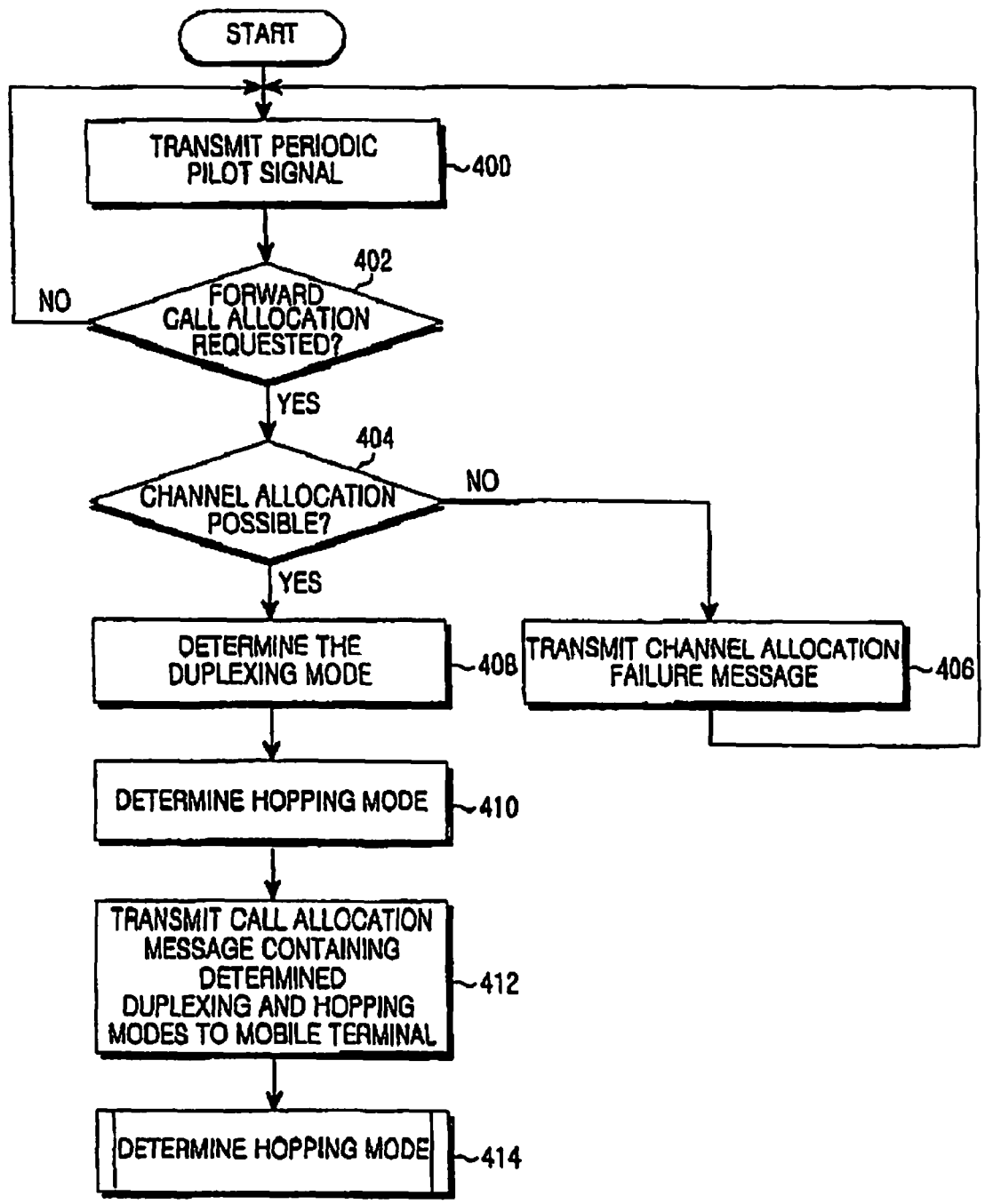
FIG. 4 is a flow chart illustrating a method of allocating a forward call from a base station to a wireless terminal according to a preferred embodiment of the present invention.

FIG. 4 is a flow chart illustrating how a base station operates to allocate a forward call to a wireless terminal according to a preferred embodiment of the present invention. Referring to FIG. 4, at step 400, the controller 311 of the base station controls periodic or constant transmission of the pilot signal, and controls transmission of other information that must be broadcast. That is, the base station periodically or continually transmits the pilot signal and transmits information that must be broadcast to wireless terminals included in the cell of the base station.

At step 402, the controller 311 determines whether a forward call allocation has been requested by a specific wireless terminal. The call allocation request includes an outgoing call transmission request made by the specific wireless terminal, the receipt of an incoming call destined for the specific wireless terminal from a network upstream of the base station, and the like. If the forward call allocation has been requested, the controller 311 proceeds to step 404; otherwise it returns to step 400.

At step 404, the controller checks physical and channel resources currently remaining for the base station to determine whether it is possible to allocate a channel for the requested call. If channel allocation is possible, the controller 311 proceeds to step 408; otherwise it moves to step 406 to produce and transmit a channel allocation failure message.

When a specific wireless terminal has requested the call allocation, the produced channel allocation failure message is transmitted to the specific wireless terminal over a specific control channel. However, when a specific node on a network upstream of the base station has requested the call allocation, the produced channel allocation failure message is transmitted to the specific node.

At step 408, the controller 311 determines a duplexing mode for the wireless terminal in the manner described above in FIGS. 1 and 2. That is, the controller 311 detects duplexing mode determination factors received from the wireless terminal. As described above, the duplexing mode determination factors include the distance between the base station and the terminal, the traveling speed of the wireless terminal, the received signal power levels of the terminal and the base station, etc. The duplexing mode determination factors may additionally include a time offset of the call allocation request signal received from the wireless terminal over an access channel. Here, if the base station receives both intensity information of a pilot signal and geographical location information of a wireless terminal from the wireless terminal, or even if it receives one of the two pieces of information, the controller 311 checks the received information. If it is determined that the wireless terminal is in motion at a low speed or it is located in the local area, the controller 311 selects the time division duplexing mode for the wireless terminal. However, if it is determined that the wireless terminal is in motion at a high speed or it is located in the remote area, the controller 311 selects the frequency division duplexing mode for the wireless terminal.

The controller 311 uses the information received from the wireless terminal to detect duplexing mode determination factors of the terminal. Based on the detected duplexing mode determination factors, the controller 311 determines a duplexing mode for reverse transmission of the wireless terminal. Based on the information received from the wireless terminal, the controller 311 of the base station determines whether the wireless terminal is located in a local or remote area of the base station. If the duplexing mode determination factors include a traveling speed of the wireless terminal, and if it indicates that the wireless terminal is in motion at a predetermined threshold speed or higher, the controller 311 determines that the wireless terminal is located in the remote area even if it is actually located in the local area, because wireless terminals in motion at high speed may enter the remote area in a short time even if they are currently located in the local area and also because they frequently cause hand-off between cells. To decrease the load of the base station and more effectively use channel resources, it is assumed that wireless terminals in motion at high speed are located in the remote area.

Based on other duplexing mode determination factors such as geographical conditions, the state of buildings around the base station, etc., it is determined whether the wireless terminal is located in the local area inside of the circle as illustrated in FIG. 2 or the remote area outside the circle.

Depending on the geographical location where the base station is installed, the boundary of the local and remote areas of the base station may have various other shapes instead of the circles illustrated in FIG. 2. However, for better understanding of the present invention, the following description will be given with reference to the circular boundary.

Based on the determination as to whether the wireless terminal is located in the local or remote area, the controller 311 of the base station determines the reverse transmission mode for the wireless terminal. In the present invention, as described above, the controller 311 enables wireless terminals located in the local area to perform transmission in the reverse direction using the TDD-only frequency resource portion and it enables wireless terminals located in the remote area to perform transmission in the reverse direction using the FDD-only frequency resource portion. As a result, based on the determination as to whether the wireless terminal is located in the local or remote area, the controller 311 of the base station sets the reverse transmission mode of the terminal. The determination can be performed not only by the controller 311 of the base station, but also by a scheduler of the BTS. Accordingly, the controller 311 of the base station determines reverse transmission timing, frequencies for the reverse transmission, etc., of the wireless terminal at the same time.

If the duplexing mode determination is completed, the controller 311 determines a hopping mode according to the present invention. Different hopping modes are determined depending on the links and the frequency range in use. A detailed description of the hopping mode determination depending on the links and the frequency range in use will be described in more detail herein below with reference to FIGS. 6 and 7.

At step 410, the controller 311 determines a frequency hopping mode. At step 412, the controller 311 transmits a call allocation message containing information of the determined duplexing and hopping modes to the wireless terminal. The base station transmits the call allocation message when it receives an outgoing call transmission request from the wireless terminal or when it receives an incoming call from a node upstream of the base station and then receives a response from the wireless terminal after paging.

After transmitting the call allocation message at step 412, the controller 311 communicates with the terminal in the modes determined at steps 408 and 412.

Figure 5:
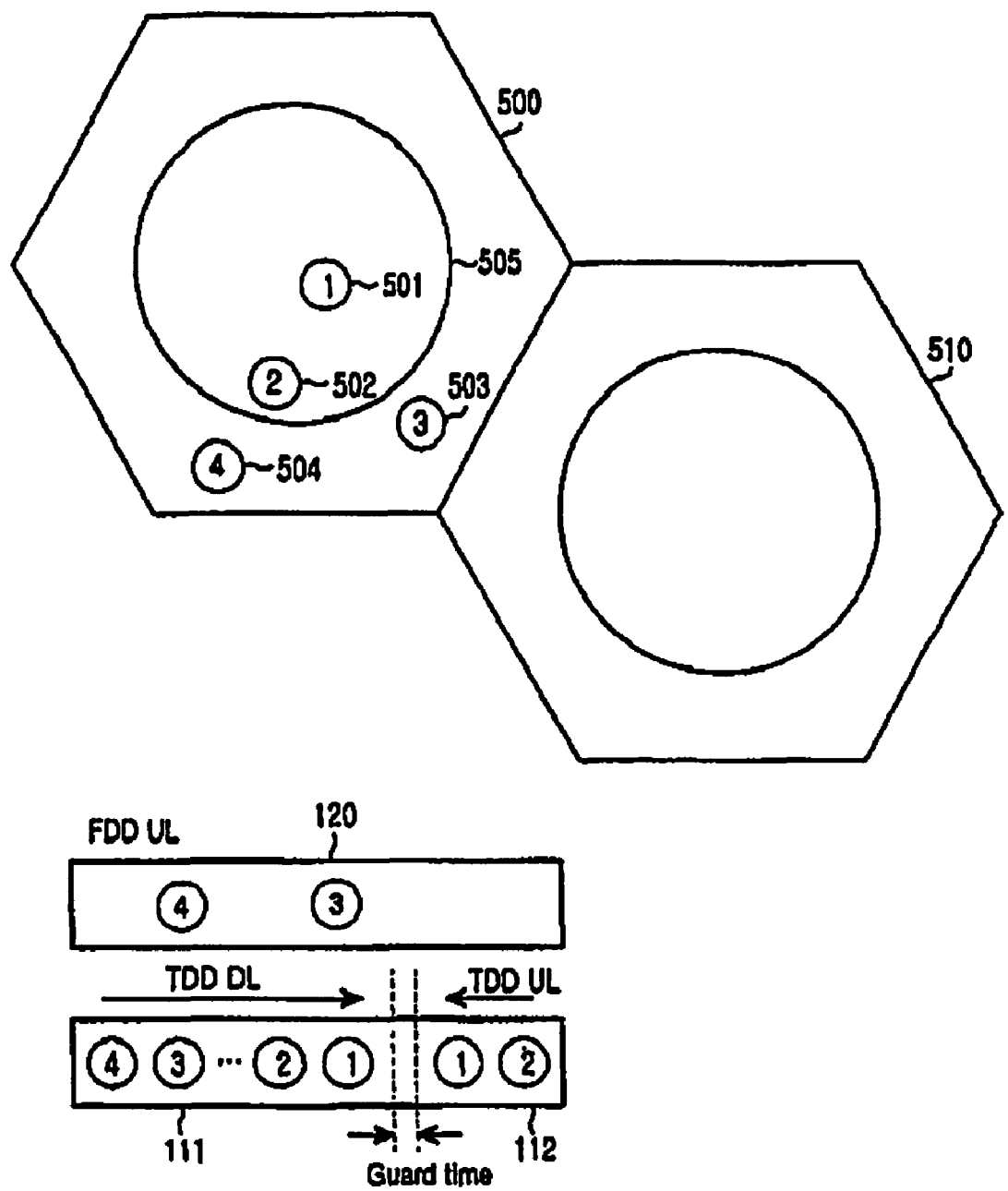
FIG. 5 illustrates a method of allocating frequencies when a base station device of a wireless communication system, which uses time and frequency division duplexing according to the present invention, allocates a call to a wireless terminal.

FIG. 5 illustrates a method for allocating frequencies when a base station device of a wireless communication system, which uses time and frequency division duplexing according to the present invention, allocates a call to a wireless terminal. Referring to FIG. 5, the hexagonal cells illustrated are ideal cell models of base stations when the wireless communication system is a cellular system as described above in FIG. 2. Hexagons denoted by 500 and 510 define respective service areas of two base stations. A circle 505, which is inside the service area 500 of a base station, defines a theoretical boundary of local and remote areas of the base station.

Wireless terminals 501, 502, 503, and 504 located in the service area 500 of the base station illustrate how frequencies and time slots are allocated depending on the locations of the wireless terminals. The first wireless terminal 501 is located in the local area at a position nearest to the base station, and the second wireless terminal 502 is located in the local area at a position farther away from the base station than the first wireless terminal 501. The third wireless terminal 503 is located in the remote area, and the fourth wireless terminal 504 is located in the remote area at a position farther away from the base station than the third wireless terminal 503.

As illustrated in the lower corner of FIG. 5, the TDD-only frequency resource portion 110 of the frequency resources available to the base station is divided into a time interval 111 for allocation to the forward link and a time interval 112 for allocation to the reverse link. The base station uses the TDD-only frequency resource portion 110 to perform traffic transmission to all the wireless terminals in the forward link. The base station allocates time slots in the time interval 111 to the wireless terminals, starting from a time slot adjacent to a guard time between the two time intervals 111 and 112. Herein, the wireless terminals are allocated the time slots in increasing order of distance from the base station. That is, in the forward link, a first time slot nearest to the guard time is allocated to the first wireless terminal 501 nearest to the base station, and then a second time slot is allocated to the second wireless terminal 502, which is the second nearest to the base station. Then, a third time slot is allocated to the third wireless terminal, which is located in the remote area but nearest to the base station among the wireless terminals located in the remote area, and a fourth time slot coming first among the slots is allocated to the fourth wireless terminal most distant from the base station.

The above description has been given under the assumption that, in each period T, forward transmission is first performed and reverse transmission is then performed after the guard time. Also when reverse transmission is first performed and forward transmission is then performed after the guard time, the allocation of time slots to the wireless terminals can be performed in the same manner as described above. Also, time slots near the guard time are allocated to wireless terminals located in the local area.

Conversely, frequency resource allocation for the transmission in the reverse direction is performed in the following manner. Reverse link time slots near the guard time are allocated to wireless terminals near the base station, which use the TTD-only frequency resource portion for the reverse transmission. That is, a reverse link time slot that is adjacent to the guard time is allocated to the first wireless terminal 501 nearest to the base station, and a next reverse link time slot is allocated to the second wireless terminal 502, which is the second nearest to the base station among the wireless terminals that use the TTD-only frequency resource portion for the reverse transmission. The time slot allocation method for the wireless terminals, which use the TDD-only frequency resource portion, minimizes interference due to synchronization failure. The time slot allocation method also minimizes inter-terminal interference, which is caused by collisions between uplink and downlink time slots between neighboring cells due to a difference in the ratio of traffic asymmetry between the neighboring cells.

The wireless terminals located in the remote area of the base station are free from the synchronization failure due to the time division because they use the frequency division duplexing method for transmission in the reverse direction. The interference caused by the difference in the traffic asymmetry ratio is also minimized.

More specifically, the base stations 500 and 510 use the TDD-only frequency resource portion to perform the reverse and forward link transmission, and they are synchronized in every transmission period. The ratio of the two time intervals respectively for forward and reverse transmission may vary depending on the time slots allocated to the forward and reverse links. This is described in detail as follows under the assumption that the period T is 20 ms and one slot in the period T is 1.25 ms. Each of the base stations has 32 time slots. If two time slots are assigned to the guard time, data transmission is performed in 30 time slots. Here, it is assumed that the first base station 500 performs transmission in the forward direction in 24 time slots and in the reverse direction in 6 time slots. It is also assumed that the second base station 510 performs transmission in the forward direction in 20 time slots and in the reverse direction in 10 time slots.

Then, the first base station 500 performs forward transmission in the 1st to 24th time slots, and performs reverse transmission in the 27th to 32nd time slots. A guard time is composed of the 25th and 26th time slots. The second base station 510 performs forward transmission in the 1st to 20th time slots, and performs reverse transmission in the 23rd to 32nd time slots. A guard time is composed of the 21st and 22nd time slots. Accordingly, in the 23rd and 24th time slots, the second base station 510 waits for signal reception, while the first base station 500 is transmitting signals, which may cause interference between the base stations.

If the time slot adjacent to the forward link guard time is allocated to a wireless terminal in the local area as illustrated in FIG. 5, the terminal can perform transmission and reception to and from the base station with small power. As the transmission power of the base station and the wireless terminal decreases, the interference with another base station or with wireless terminals belonging thereto decreases. Accordingly, the interference caused by the difference in the traffic asymmetry ratio between the cells is minimized.

The above description of transmission in the reverse link has been given only for traffic transmission. That is, the above description of the reverse transmission has not been given for channel state feedback. As described above, all terminals in the local and remote areas use the FDD-only frequency resource portion 120 as channels for feeding the channel state information, etc., back to the base station. It should be noted that the description of FIG. 5 has been given only for data traffic transmission. All the terminals in the local and remote areas, including the first and second wireless terminals 501 and 502, can use the FDD-only frequency resource portion 120 as the feedback channels. When all the terminals use the FDD-only frequency resource portion 120 as the feedback channels for informing the base station of their channel conditions, a comb-type allocation method is preferably used to allocate resources of the FDD-only frequency resource portion 120 so that their pilot signals are distributed uniformly over the resources.

In the following description, the term "hierarchical cell environment" is used to describe a specific cell environment in which the cell is divided into local and remote areas as illustrated in FIG. 5. Effective technologies for data and traffic transmission in the forward and reverse directions in such a hierarchical cell environment will now be described.

In the following description, it is assumed that the first wireless terminal 501 receives data in the forward link, the second wireless terminal 502 transmits data in the reverse link, the third wireless terminal 503 receives data in the forward link and the fourth wireless terminal 504 transmits data in the reverse link. A description will now be given of methods that can be ideally used on the assumption that the cell has the hierarchical cell environment and the terminals receive and transmit data in the directions described above.

The first and second wireless terminals 501 and 502 are located in the local area. As described above, the MIMO and AMC technologies can be used for the terminals located in the local area. Of course, the OFDMA technology, which is applied in the embodiments of the present invention, can also be used for the terminals located in the local area. That is, a frequency-efficient multiple access method is used for the terminals located in the local area. The wireless terminals located in the local area are stationary or have nomadic mobility.

The third and fourth wireless terminals 503 and 504 are located in the remote area or are in motion at high speed. It is thus preferable to allocate channels robust against interference to the terminals located in the remote area or in motion at high speed, and it may not be preferable to apply the MIMO or MAC technologies thereto in the same manner as in the local area. Instead, frequency Hopping (FH) and spreading methods, which will be described later, can be used for the terminals. The MIMO method can use Div. or Mux techniques. More specifically, it is preferable to use a fast frequency hopping method for the third wireless terminal 503 that receives data in the forward link using the TDD-only frequency resource portion 120, whereas it is preferable to use a slow frequency hopping method for the reverse link using the FDD-only frequency resource portion 120.

Of course, the OFDMA technology, which is applied in the embodiments of the present invention, can also be used for the third and fourth wireless terminals 503 and 504. That is, an interference avoidance/averaging based multiple access method is used for the terminals located in the remote area.

Table 1 lists communication technologies suitable for each link under the above-described assumption of the locations and data transmission directions of the first to fourth wireless terminals 501 to 504.

TABLE 1

| Terminals | multiple access | RRM | MIMO | Sync |
|---|---|---|---|---|
| 1st terminal | AMC MIMO OFDMA | Bit Loading or water-filling, Optimum | SVD, Tx. Optimum | |

TABLE 1-continued

| Terminals | multiple access | RRM | MIMO | Sync |
|---|---|---|---|---|
| 2nd terminal | AMC MIMO OFDMA | Interleaved resource allocation | SVD | Pre-compensated |
| 3rd terminal | Fast FH or Spreading, OFDMA | DCA, DPA | Div. STBC/ Diff STC Mux. | |
| 4th terminal | Slow FH OFDMA | DCA, DPA | Div., Mux | |

In Table 1, "Div." stands for space diversity and indicates that a Space Time Block Code (STBC) or a Differential Space Time Code (DSTC) is used, "Mux." indicates that a spatial multiplexing method is used, and "SVD" stands for Singular Value Decomposition. In the SVD method, under the assumption that the TDD forward link has channel reciprocity, the base station can use, in transmission in the forward link, the same information as channel response information of a forward channel used between the terminal and the base station used in the forward link. If SVD is performed on a multiple antenna channel matrix H, the communication link between the terminal and the base station can be equivalently expressed as N parallel spatial channels that are disjointed, where N is the smaller of the two numbers of the transmitting/receiving antennas. By applying a water-filling algorithm, as a filling technique, to the separated special channels, it is possible to calculate transmission power of each transmitting antenna so as to increase the MIMO channel capacity. When data for transmission is bit-loaded to each transmitting antenna with the transmission power calculated based on this method, it is possible to obtain a throughput approaching the total channel capacity only if the amount of data to be loaded differs according to the transmitting antennas.

Because the SVD method is relatively sensitive to channel estimation errors, the SVD method can be used when it is desired to provide high transfer rates for terminals that are stationary or moving very slowly (i.e., when there is almost no change in channels during a relatively long time interval or when the terminals are located in the center of the cell where channel estimation is relatively correct). Accordingly, Table 1 shows that the SVD method is applied only to the first and second wireless terminals 501 and 502.

A frequency hopping method can be additionally used according to the present invention. In short, the frequency hopping method increases the throughput of wireless terminals near the base station and wireless terminals distant therefrom while changing their frequencies in addition to the time slots.

Figure 6:
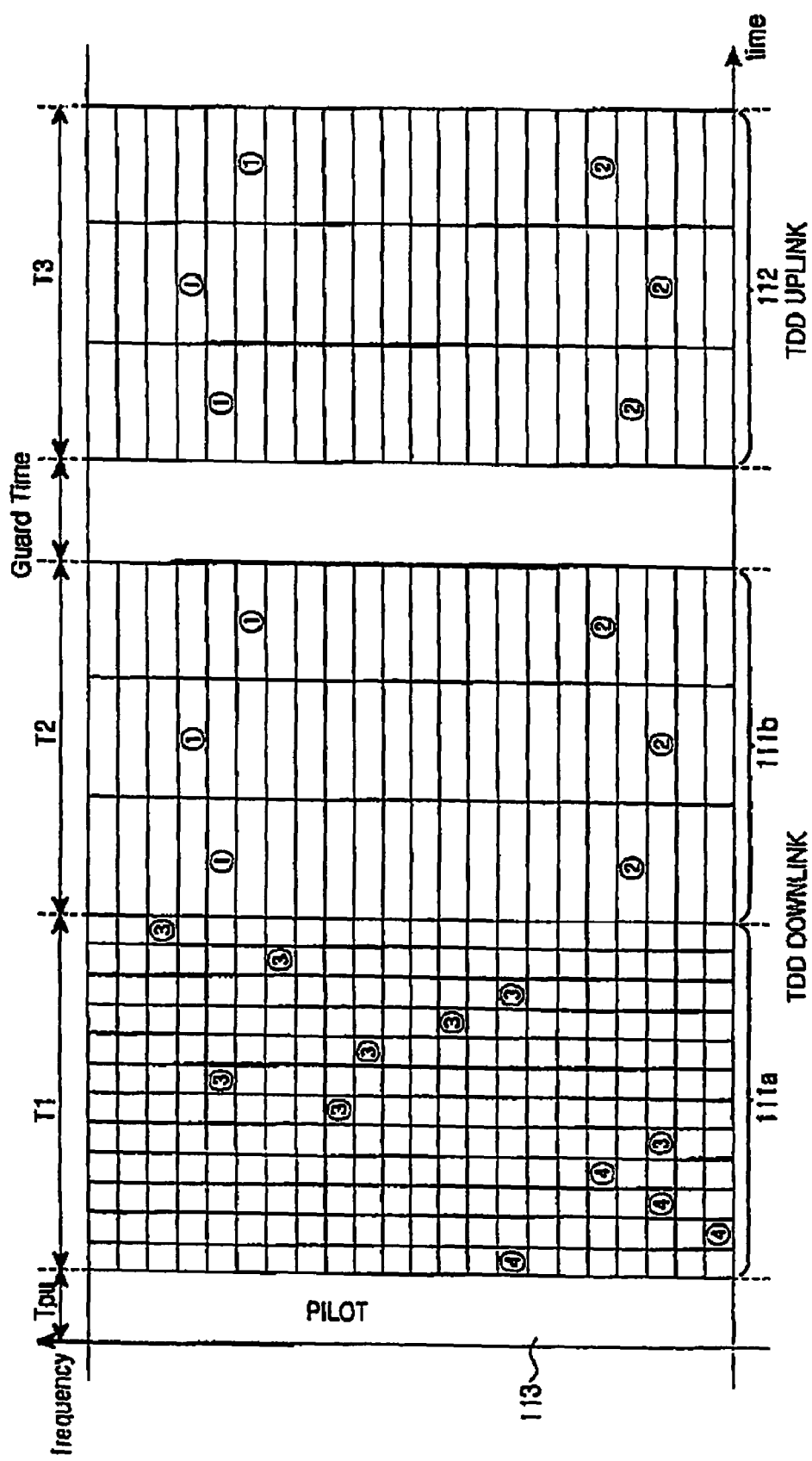
FIG. 6 illustrates time division and frequency hopping methods of the TDD-only frequency resource portion according to a preferred embodiment of the present invention.
Figure 7:
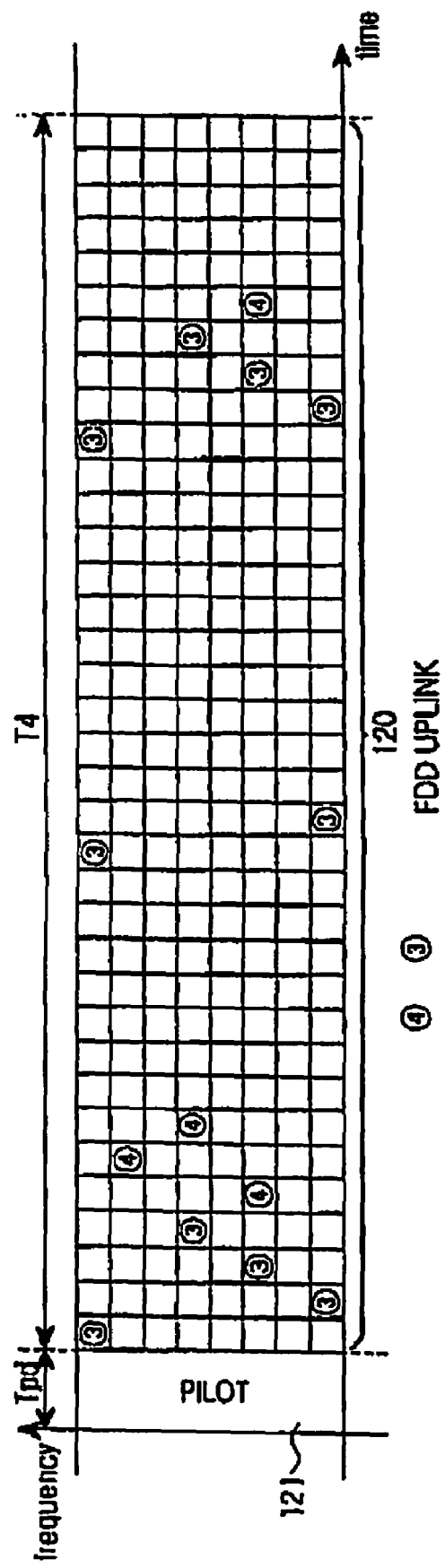
FIG. 7 illustrates time division and frequency hopping methods of the FDD-only frequency resource portion for transmission in the reverse direction according to a preferred embodiment of the present invention.

FIG. 6 illustrates time division and frequency hopping methods of the TDD-only frequency resource portion according to a preferred embodiment of the present invention. FIG. 7 illustrates time division and frequency hopping methods of the FDD-only frequency resource portion for transmission in the reverse direction according to a preferred embodiment of the present invention.

Referring to FIG. 6, in one period T, the TDD-only frequency resource portion is divided into a pilot signal transmission period Tpu, a first time interval T1 for allocation to wireless terminals in the remote area for transmission in the forward link, and a second time interval T2 for allocation to wireless terminals in the local area for transmission in the forward link. The TDD-only frequency resource portion is further divided into a guard time next to the second time interval T2 and a third time interval T3 for allocation to wireless terminals for transmission in the reverse direction.

In this method, each of the cells illustrated in FIG. 6, into which a first frequency resource area 111a corresponding to the first time interval T1 is divided, defines a frequency and a time slot that can be allocated to one wireless terminal. Frequency resource cells denoted by "③" and "④" in the first frequency resource area 111a of the first time interval T1 define hopping frequencies and time slots for allocation to wireless terminals in the remote area. A fast frequency hopping OFDMA method can be used for the first frequency resource area 111a according to the present invention.

Frequency resource cells denoted by "①" and "②" in a second frequency resource area 111b, corresponding to the second time interval T2, define hopping frequencies and time slots for allocation to wireless terminals in the local area for transmission in the forward link. An AMC OFDMA method, a water filling OFDMA method, or a MIMO OFDMA method can be used for the second frequency resource area 111b according to the present invention.

Frequency resource cells denoted by "①" and "②" in a third frequency resource area 112, corresponding to the third time interval T3, define hopping frequencies and time slots for allocation to wireless terminals in the local area for transmission in the reverse link. Although the third frequency resource area 112 is based on the AMC OFDMA method for providing channel state information for the AMC and water filling according to the present invention, a comb-type or interleaved-type method may be used for subcarrier allocation to each user.

The time division and frequency hopping methods of the FDD-only frequency resource portion for transmission in the reverse direction and corresponding multiple access and transmission methods according to the preferred embodiment of the present invention will be now be described with reference to FIG. 7. As illustrated in FIG. 7, the FDD-only frequency resource portion is divided into a pilot signal transmission period Tpd and a fourth time interval T4 for allocation to wireless terminals in the remote area for reverse transmission (i.e., transmission in the uplink).

FIG. 6 illustrates that fast frequency hopping is performed in the first time interval T1 during which resources are allocated to the terminals in the remote area. That is, in FIG. 6, each time interval allocated to the terminals in the remote area occupies a small time interval. Additionally, slow frequency hopping is performed in the second time interval T2 during which resources are allocated to the terminals in the local area. That is, in FIG. 6, each time interval allocated to the terminals in the local area occupies a large time interval. The frequency hopping method and the MIMO and AMC techniques can be applied to the terminals in the local area.

In this case, because the terminals in the remote area perform transmission in the uplink, power consumption of the terminals, and interference thereof, neighboring base station cells must taken into consideration. Accordingly, a slow frequency hopping OFDMA method, which uses slow frequency hopping, compared to the fast frequency hopping OFDMA method used for the forward link resource area of the first time interval T1 for allocation to the wireless terminals in the remote area described in FIG. 6, may be used for the fourth frequency resource area T4.

As described above in FIGS. 6 and 7, because the frequency hopping is used for transmission in the forward and reverse directions, the frequency hopping must be performed according to a prescribed scheme or all the base stations and the wireless terminals must know the rule for frequency hopping. Accordingly, the step 410 of determining the hopping mode is needed as illustrated in FIG. 4.

Figure 8:
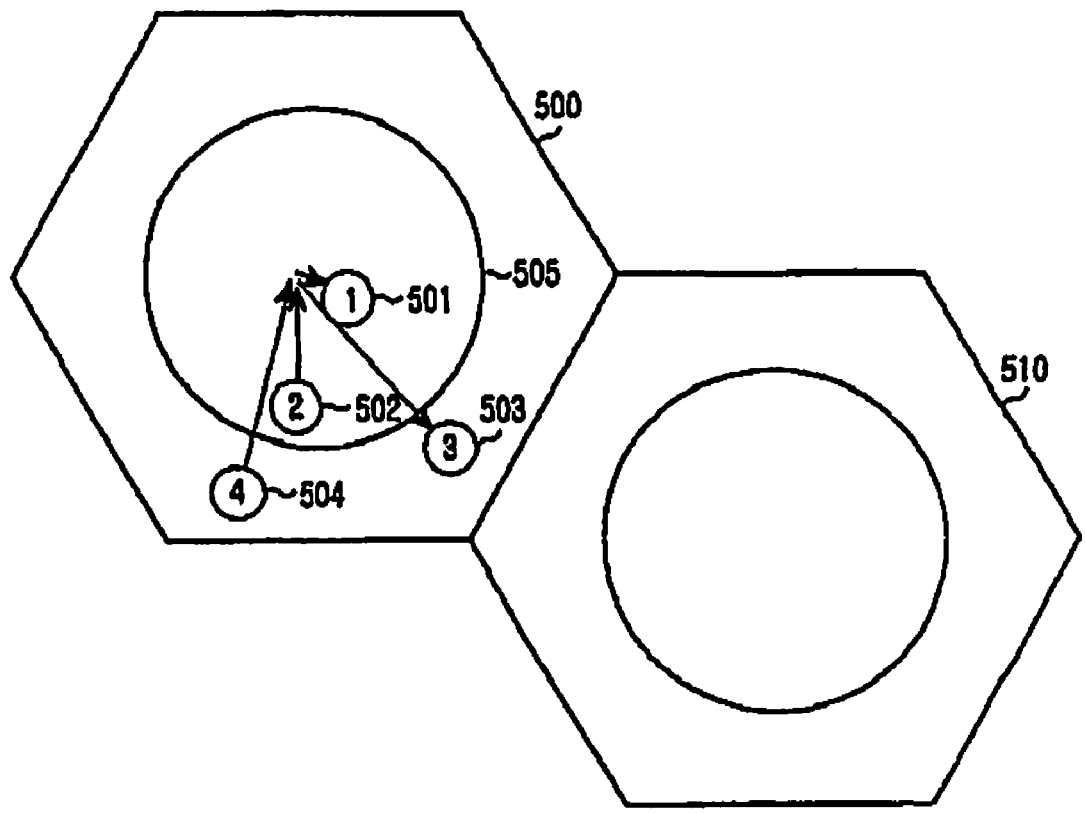
FIG. 8 illustrates data transmission between a base station and a wireless terminal according another embodiment of the present invention.
Figure 8:
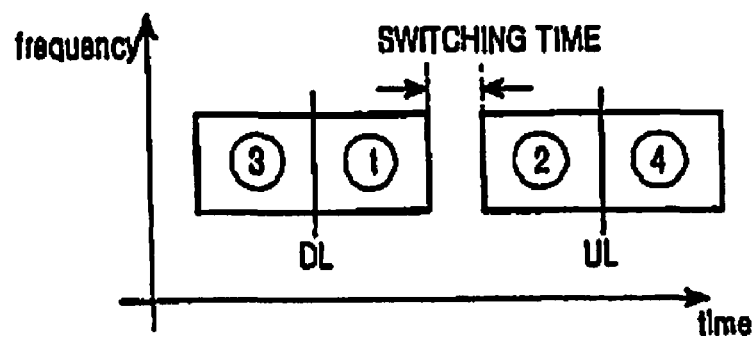

FIG. 8 is a conceptual diagram illustrating a method for transmitting data between a base station and terminals according to another embodiment of the present invention. In FIG. 8, the service area of a base station is divided into a local area 505 and a remote area 500 as described above. The determination of the local and remote areas 505 and 500 are based not only on the distance from the base station but also on the duplexing mode determination factors as described above. For example, the determination may also be based on the mobility or traveling speed of the terminals. Here, it is assumed that first and second wireless terminals 501 and 502 are determined to be located in the local area, and third and fourth wireless terminals 503 and 504 are determined to be located in the remote area. It is also assumed that the first and second wireless terminals 501 and 503 receive data in the forward link and the second and fourth wireless terminals 502 and 504 transmit data in the reverse link.

In the embodiment of FIG. 8, frequencies are divided into a time interval for the forward link DL and a time interval for the reverse link UL. A switching time is defined between the time intervals for the forward and reverse links DL and UL to avoid data overlap. The wireless terminals transmit data in the forward link DL in decreasing order of distance from the base station (i.e., the terminal in the remote area and the terminal 501 in the local area perform data transmission in the named order). The wireless terminals transmit data in the reverse link UL in increasing order of distance from the base station (i.e., the terminal 502 in the local area and the terminal 504 in the remote area perform data transmission in the named order). As described above, the MIMO and AMC techniques can be applied to the terminals located in the local area, whereas the frequency hopping and/or spreading methods and the OFDMA method can be applied to the terminals located in the remote area.

Figure 9:
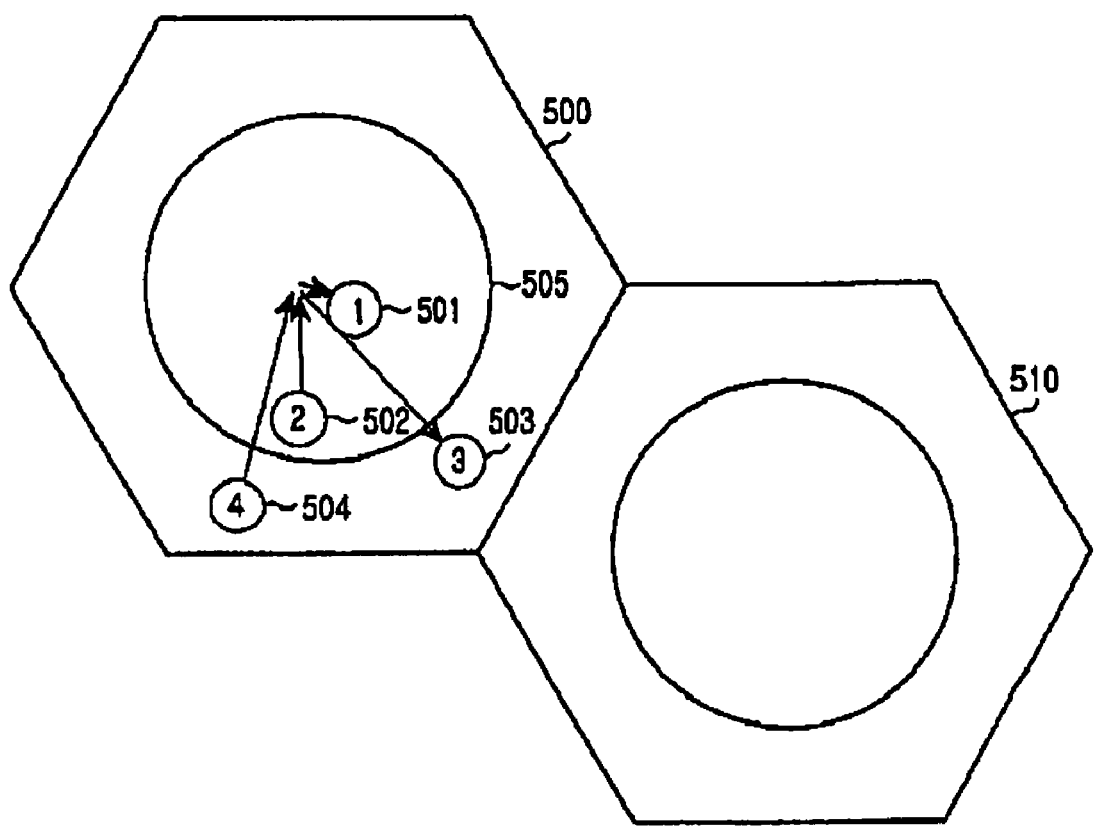
FIG. 9 illustrates data transmission between a base station and a wireless terminal according still another embodiment of the present invention.
Figure 9:
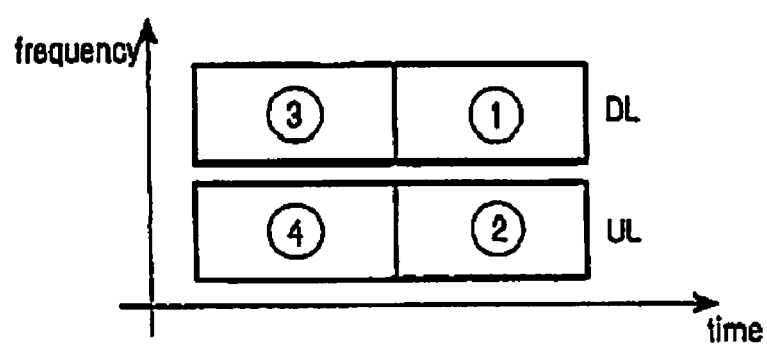

FIG. 9 is a conceptual diagram illustrating a method for transmitting data between a base station and terminals according to still another embodiment of the present invention. This embodiment will be described under the same assumption as in FIG. 8. In this embodiment, frequencies allocated to the forward link DL are separated from frequencies allocated to the reverse link UL as illustrated in FIG. 9. For both the forward and reverse transmission, the wireless terminals are allocated the frequencies in decreasing order of distance from the base station. That is, terminals 503 and 504 located in the remote area are first allocated frequencies, after which terminals 501 and 502 located in the local area are allocated frequencies. The separate frequency allocation of this embodiment avoids a decrease in the total capacity caused by the switching time.

Figure 10:
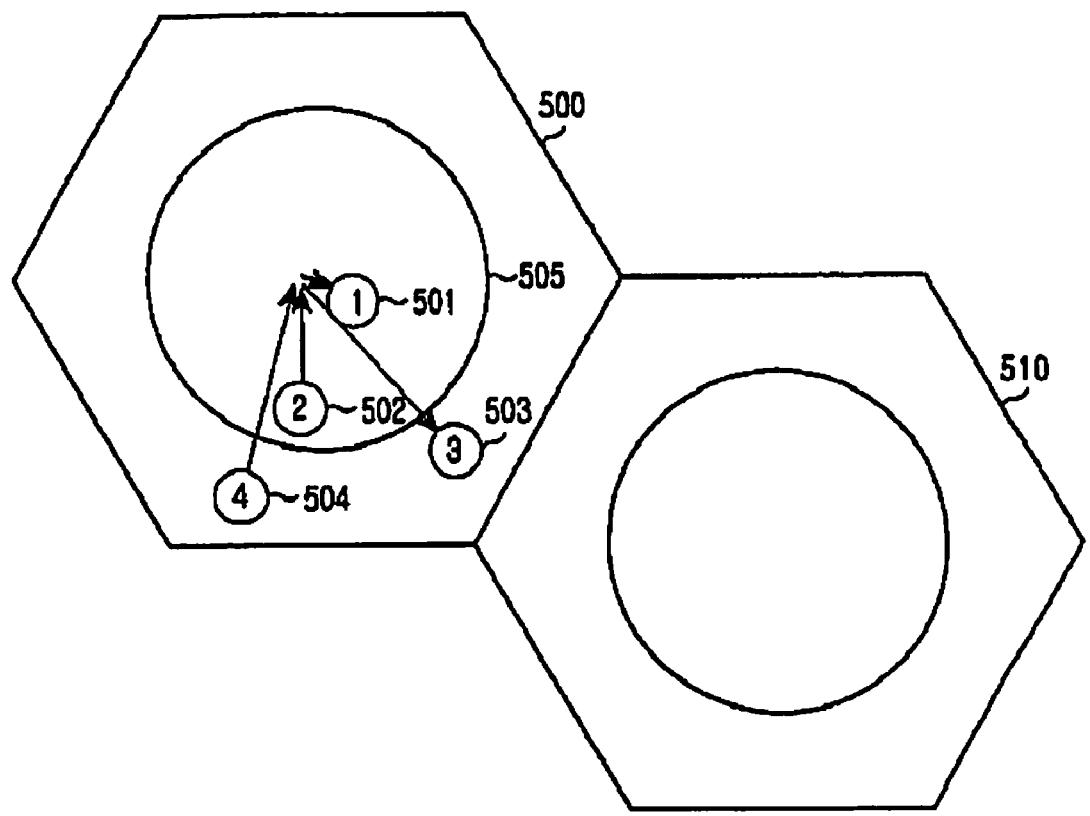
FIG. 10 illustrates data transmission between a base station and a wireless terminal according yet another embodiment of the present invention.
Figure 10:
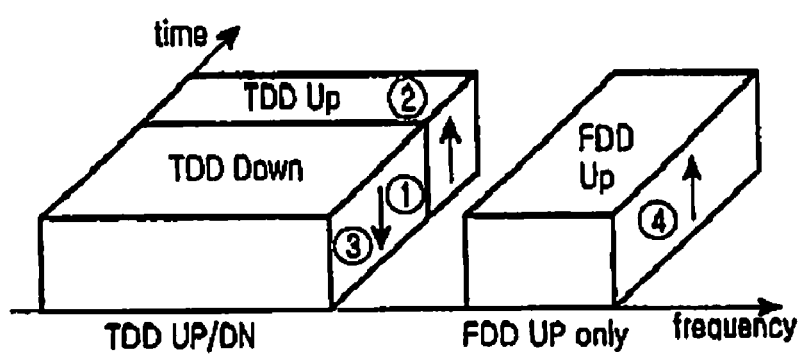

FIG. 10 is a conceptual diagram illustrating data transmission between a base station and a terminal in accordance with a yet another preferred embodiment of the present invention. It should be noted that the data transmission method of FIG. 10 is based on the same assumption as in FIGS. 8 and 9. FIG. 10 depicts an exemplary case in which the TDD mode and FDD mode are used at the same time. In more detail, a terminal in the remote area and a terminal in the local area are distinguished from each other in the same manner as in FIG. 1. Individual reverse links of the long-distance terminals perform reverse transmission using dedicated sub-carriers. Individual forward links of the long-distance and short-distance terminals perform time division using the remaining resources other than frequency resources equal to reverse-dedicated assignment frequency resources in a long-distance area usable by the base station, such that they establish data transmission. For reverse transmission of the short-distance terminals, a reverse transmission operation is performed using the TDD dedicated frequency resources during a predetermined period of time.

As described above, FIG. 10 depicts cell areas of terminals capable of performing forward/reverse transmission associated with individual directions and their associated resource division states. In more detail, data of the TDD dedicated frequency resources is transmitted to the first wireless terminal 501 and the third wireless terminal 503 via a forward link. The second wireless terminal 502 of the TDD dedicated frequency resources transmits data via a reverse link. In case of FDD dedicated frequency resources, only the fourth wireless terminal 504 can transmit data.

The reverse-dedicated frequency resources of the present invention may be adapted as only a feedback channel for checking a channel situation between the base station and terminals. In this case, the reverse-dedicated frequency resources may be added to either the long-distance reverse channel or the time-division frequency dedicated resources if needed.

As is apparent from the description above, the present invention provides optimal communication service to users in motion by providing different division duplexing methods, such as the TDD and FDD, and also using various multiple access methods suitable for each of the duplexing methods. The AMC method and the frequency hopping method are used at the same time, thereby gaining each benefit of the two methods. In addition, a random frequency hopping technique is used for users in motion at a reference speed or higher, thereby enabling the frequency reuse factor in multiple cells to approach almost one.

The above-described features make it possible to maximize frequency reuse efficiency.

Although preferred embodiments of the present invention have been disclosed for illustrative purposes, those skilled in the art will appreciate that various modifications, additions, and substitutions are possible, without departing from the scope and spirit of the present invention as disclosed in the accompanying claims.

What is claimed is:

1. A method for transmitting and receiving data by a base station for communication with a wireless terminal using an OFDMA scheme, the method comprising the steps of:
   determining a data transmission period using the OFDMA scheme;
   determining a time interval for a forward link, a time interval for a reverse link and a switching time between the two time intervals in the data transmission period;
   allocating time slots for data transmission in the forward link, included in the time interval for the forward link, to wireless terminals located in local and remote areas of the base station in a decreasing order of distances of the wireless terminals from the base station;
   allocating time slots for data reception in the revere link, included in the time interval for the reverse link, to wireless terminals located in the local and remote areas in an increasing order of distances of the wireless terminals from the base station; and
   transmitting data in the time interval for the forward link and receiving data in the time interval for the reverse link.

2. The method according to claim 1, further comprising the step of:
   determining whether a wireless terminal is located in the local area or in the remote area of the base station, based on at least one of a distance between the wireless terminal and the base station, a traveling speed of the wireless terminal, and a received signal power level of the base station and the wireless terminal.

3. The method according to claim 1, wherein a MIMO method and an AMC method are used for communication with terminals located in the local area of the base station.

4. The method according to claim 1, wherein frequency hopping and spreading methods are used for communication with terminals located in the remote area of the base station.

5. The method according to claim 1, wherein the switching time is set to a minimum time interval capable of preventing data overlap between data in the forward link and data in the reverse link.

6. A method for transmitting and receiving data by a base station for communication with a wireless terminal using an OFDMA scheme, the method comprising the steps of:

determining an orthogonal frequency band for a forward link and an orthogonal frequency band for a reverse link in an available orthogonal frequency band;

allocating the determined orthogonal frequency bands for the forward link and the reverse link to wireless terminals located in local and remote areas of the base station in a decreasing order of distances of the wireless terminals from the base station; and transmitting and receiving data through the allocated orthogonal frequency bands in the forward and reverse links, respectively.

7. The method according to claim 6, further comprising the step of determining whether the wireless terminal is located in the local area or in the remote area of the base station, based on at least one of a distance between the wireless terminal and the base station, a traveling speed of the wireless terminal, and a received signal power level of the base station and the wireless terminal.

8. The method according to claim 6, wherein a MIMO method and an AMC method are used for communication with terminals located in the local area.

9. The method according to claim 6, wherein frequency hopping and spreading methods are used for communication with terminals located in the remote area.

* * * * *